(12) United States Patent
Tarayan et al.

(10) Patent No.: US 12,506,957 B2
(45) Date of Patent: Dec. 23, 2025

(54) INTERIOR MONITORING SYSTEM AND METHOD FOR OPERATING SAME, AND VEHICLE COMPRISING SUCH AN INTERIOR MONITORING SYSTEM

(71) Applicant: MERCEDES-BENZ GROUP AG, Stuttgart (DE)

(72) Inventors: Emin Tarayan, Sindelfingen (DE); Sebastian Säger, Sindelfingen (DE); Stefan Kalchmair, Aidlingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/856,322

(22) PCT Filed: Apr. 3, 2023

(86) PCT No.: PCT/EP2023/058712
§ 371 (c)(1),
(2) Date: Oct. 11, 2024

(87) PCT Pub. No.: WO2023/198498
PCT Pub. Date: Oct. 19, 2023

(65) Prior Publication Data
US 2025/0260894 A1 Aug. 14, 2025

(30) Foreign Application Priority Data
Apr. 12, 2022 (DE) ............. 10 2022 001 262.6

(51) Int. Cl.
*H04N 7/18* (2006.01)
*A61B 5/1171* (2016.01)
(Continued)

(52) U.S. Cl.
CPC .......... *H04N 23/64* (2023.01); *A61B 5/1176* (2013.01); *G06T 7/0002* (2013.01); *G06V 20/52* (2022.01);
(Continued)

(58) Field of Classification Search
CPC .......... H04N 7/18; H04N 23/64; G06V 20/52; G06V 40/172; G06V 20/597;
(Continued)

(56) References Cited

U.S. PATENT DOCUMENTS 6,412,813 B1 * 7/2002 Breed ................. B60R 21/0154
342/72
10,192,126 B2 * 1/2019 Yamanaka ................ G06T 7/70
(Continued)

FOREIGN PATENT DOCUMENTS

| DE | 102011110486 A1 | 2/2013 |
|---|---|---|
| DE | 102014200783 A1 | 7/2015 |

(Continued)

OTHER PUBLICATIONS

International Search Report and Written Opinion mailed Jun. 13, 2023 in related/corresponding International Application No. PCT/EP2023/058712.
(Continued)

*Primary Examiner* — Trang U Tran
(74) *Attorney, Agent, or Firm* — PATENT PORTFOLIO BUILDERS PLLC

(57) ABSTRACT

Operating a camera-based interior monitoring system involves configuring, depending on the evaluated sensor signals, parameters for setting the interior monitoring system. A computing unit executes at least two applications, each requiring a different configuration value for a parameter in a certain operating situation. A current application rank order for a current operating situation is established and
(Continued)

the configuration value for the first parameter required by the application having the higher rank is set as a target configuration. For each application, configuration values of parameters are accorded a significance. A further parameter is configured according to the target configuration of a subordinate application if the significance of the configuration value of the target configuration of the further parameter of the subordinate application is greater than the significance of the configuration value of the target configuration of the parameter of the superordinate application.

12 Claims, 2 Drawing Sheets

(51) Int. Cl.
| | |
|---|---|
| *G06T 7/00* | (2017.01) |
| *G06V 20/52* | (2022.01) |
| *H04N 23/60* | (2023.01) |
| *A61B 5/00* | (2006.01) |
| *G06V 20/59* | (2022.01) |
| *G06V 40/16* | (2022.01) |
| *G06V 40/20* | (2022.01) |

(52) U.S. Cl.
CPC ... *A61B 5/6893* (2013.01); *G06T 2207/30168* (2013.01); *G06T 2207/30196* (2013.01); *G06T 2207/30232* (2013.01); *G06T 2207/30268* (2013.01); *G06V 20/593* (2022.01); *G06V 20/597* (2022.01); *G06V 40/172* (2022.01); *G06V 40/20* (2022.01)

(58) Field of Classification Search
CPC .... G06V 20/593; G06V 40/20; G06T 7/0002; G06T 2207/30168; G06T 2207/30196; G06T 2207/30232; G06T 2207/30268; A61B 5/1176; A61B 5/6893
USPC ........................................................ 348/148
See application file for complete search history.

(56) References Cited

U.S. PATENT DOCUMENTS

| | | | | |
|---|---|---|---|---|
| 10,451,729 | B2* | 10/2019 | Khlifi | .................. G01S 13/86 |
| 11,524,691 | B2* | 12/2022 | Gallagher | ......... B60W 50/0098 |
| 11,669,090 | B2* | 6/2023 | Konrardy | ............... G05D 1/617 |
| | | | | 701/23 |
| 11,845,440 | B2* | 12/2023 | Sloushch | ............. G01S 13/522 |
| 11,978,266 | B2* | 5/2024 | Arar | ...................... G06V 20/56 |
| 2014/0221781 | A1 | 8/2014 | Schrauf et al. | |
| 2015/0203122 | A1 | 7/2015 | Gensler et al. | |
| 2016/0107574 | A1 | 4/2016 | Voelkel et al. | |

FOREIGN PATENT DOCUMENTS

| | | |
|---|---|---|
| DE | 102014221039 A1 | 4/2016 |
| DE | 102019001563 A1 | 9/2019 |
| DE | 102019215691 A1 | 4/2021 |
| JP | 2008053901 A | 3/2008 |
| JP | 2008282153 A | 11/2008 |
| JP | 2010198313 A | 9/2010 |
| JP | 2020050077 A | 4/2020 |

OTHER PUBLICATIONS

Office Action created Nov. 25, 2022 in related/corresponding DE Application No. 10 2022 001 262.6.
Office Action dated Jan. 14, 2025 in related/corresponding EP Application No. 23718621.
Office Action dated Sep. 9, 2025 in related/corresponding JP Application No. 2024-559218.

* cited by examiner

INTERIOR MONITORING SYSTEM AND METHOD FOR OPERATING SAME, AND VEHICLE COMPRISING SUCH AN INTERIOR MONITORING SYSTEM

BACKGROUND AND SUMMARY OF THE INVENTION

Exemplary embodiments of the invention relate to a method for operating a camera-based interior monitoring system, to an interior monitoring system, and to a vehicle comprising such an interior monitoring system.

More and more vehicles are being fitted with an interior monitoring system to provide a range of comfort and/or safety functionalities. By way of example, a seat occupancy sensor and a seat belt sensor can be used to determine whether a vehicle occupant is not fastened in when travelling in the vehicle. If this is the case, then a warning can be issued. Using cameras, a corresponding interior monitoring system is also able to observe vehicle occupants. This makes it possible, for example, to analyze whether a person driving the vehicle is paying sufficient attention to their surroundings or is tired, or also to identify people using biometric features.

Such tasks or functionalities based on monitoring the vehicle interior using cameras are referred to hereinbelow as applications. Depending on the application, various requirements are placed on the optical capture of the vehicle interior. If, for example, the only person in the vehicle is the driver, it is not relevant to optically monitor the rear passenger compartment. If the person driving the vehicle is wearing anti-infrared glasses, it is not possible to capture a blink of an eye or the direction of the person's gaze in the infrared light spectrum, thus making it unnecessary to record camera images in the infrared light spectrum. In such a case, capturing colored camera images could be advantageous for other applications. To detect persons sitting on vehicle seats, only a comparatively low camera resolution is required. However, if the aim is to identify persons, a higher camera resolution is required in order to be able to recognize biometric features.

Therefore, every time there is a new operating situation, this raises the question as to how the interior monitoring system is to be operated so that the various applications can best fulfil their respective task.

A method and a device for monitoring at least one vehicle occupant and a method for operating at least one assistance device are known from DE 10 2011 110 486 A1. The method provides camera-based monitoring of the vehicle occupants in order to capture the vital parameters of the latter. If fluctuations in brightness occur in the vehicle's surroundings, for example because the vehicle is driving through a tunnel, then the vehicle can recognize this and automatically switch the image capture mode of the camera used to monitor the vehicle occupants from capturing color images to capturing images in the infrared light spectrum and vice versa.

The problem addressed by the present invention is that of specifying an improved method for operating a camera-based interior monitoring system that can be used to enable the interior monitoring system to best fulfil the tasks associated with the provision of at least two different applications.

In a generic method for operating a camera-based interior monitoring system, at least one camera is used as a sensor to capture camera images. A computing unit evaluates corresponding sensor signals and establishes configuration values and configures parameters for setting the interior monitoring system as a function of the evaluated sensor signals. The configuration values of the parameters are established, for example, by calculation, iterative methods, or rules in such a way that the camera image quality required for an application can be achieved. The generic method is developed according to the invention in that the computing unit provides at least two applications, which preferably evaluate the same sensor signals of the camera at the same time and each of which requires a different configuration value for at least one first parameter in a certain operating situation at the same point in time, wherein the computing unit establishes a current application rank order for a current operating situation and sets the configuration value for the first parameter required by the application having the higher rank as a target configuration. Evaluating the same sensor signals at the same time means that the applications work in parallel based on the sensor signals determined and received by the camera.

In other words, according to the method according to the invention, the applications provided by the computing unit are sorted by their "importance" and the interior monitoring system, in particular configuration values of the camera, is/are ultimately set so that the application with the greatest importance works optimally. In the context of the present description, a configuration value corresponding to the target configuration is a minimum configuration value for a parameter that is required for an optimum function without restricting an application in an operating situation. The corresponding configuration of the parameters means that the camera images generated by the camera, and therefore the information derived by the computing unit by analyzing the camera images or sensor signals, enable the requirements set by the application having the greatest importance to be fulfilled in the best possible way in the respective operating situation. However, this can simultaneously mean that the functionalities provided at the same time by less important applications can only be provided to a limited extent or with a reduced degree of accuracy. However, since these other applications are less important for the current operating situation, this is acceptable. Since the at least two applications receive the same sensor signals at the same time and evaluate and process them in parallel, an information loss caused by switching camera parameters can be avoided.

The term operating situation includes ambient conditions such as brightness, vehicle occupancy, driving conditions, shadows from objects, or insolation.

The computing unit assesses the current operating situation as a function of the evaluated sensor signals. These sensor signals include the camera images generated by the camera and sensor data from other sensors. The method according to the invention can be used in a vehicle, whereby, for example, a seat belt sensor, seat occupancy sensor, brightness sensor, or also vehicle-intrinsic information, such as a speed of travel or acceleration of the vehicle, can be used as a sensor or sensor data. For example, there are different operating situations if a certain vehicle seat is occupied by a vehicle occupant, the vehicle is travelling at a certain speed of travel, certain lighting conditions prevail, which requires a corresponding reassessment of the respective operating situation and accordingly the reconfiguration of the parameters for setting the interior monitoring system.

It is further provided according to the invention that for each application, the configuration values of the application are each accorded a significance and at least one further parameter is configured according to the target configuration required by a subordinate application in the application rank order if the significance of the configuration value of the target configuration of the further parameter of the subordinate application is greater than the significance of the configuration value of the target configuration of the parameter of the superordinate application.

As mentioned above, less important applications are operated at the same time as more important applications outside their respective optimum operating parameters. In order to tolerate an unnecessarily high level of degradation or deterioration of a respective functionality provided by the corresponding less important application, parameters that are less significant for a more important application can be configured according to the target configuration of the less important application, provided the latter are above the minimum configuration value of the more important application. In other words, the parameters of the higher-ranking application are overwritten with configuration values of these parameters of the lower-ranking application camera setting, provided that these are better, i.e., have a higher significance, otherwise the configuration values of the higher-ranking application are used. The significance of the configuration values arises from technical features, for example a high resolution is more significant than a low resolution, a low signal-to-noise ratio is more significant than a high signal-to-noise ratio. Moreover, it can also be arbitrarily defined that one configuration value is more significant than another, for example it can be defined that IR images are more significant than RGB images. For this purpose, for example, only two applications or else more than two applications can be taken into account. By way of example, the parameters for setting the interior monitoring system are configured according to the target configuration required by the application with the highest rank, unless the significance of the configuration value of the target configuration of the subordinate application is greater. In the case of contradictory features, it is not possible to assign different levels of significance, for example if the higher-ranking application demands a short exposure time and the lower-ranking application a long exposure time, then the parameter exposure time is always set to the value required by the higher-ranking application by specifying the same significance.

The application with the highest rank is referred to hereinbelow as the first application. The subordinate applications in the application rank order are referred to accordingly as second and third application.

A first parameter that is important for providing the full functionality of the first application is then configured according to the target configuration of the first application to the configuration values for this parameter. A second configuration value of a parameter, which is accordingly lower for the optimum functioning of the first application compared to the second application in terms of the target configuration, can then be configured according to the target configuration of the second application. A third parameter with a configuration value that is less significant for the optimum functioning of the first and second application compared to a third application with regard to the target configuration can then be set to the configuration value corresponding to the target configuration of the third application. The method advantageously establishes a configuration of the camera parameters for each application according to the rank, so that the operating principle is optimized for each application.

According to a further advantageous embodiment of the method, the computing unit dynamically determines application requirements and/or an application quality required for each application for each changing current or future operating situation and determines the application rank order and/or the significance of the configuration parameters as a function of the application requirements and/or the application quality of a respective application.

In order to assess the operating situation-dependent importance of the applications, the application rank order needs to be determined anew for each operating situation. Depending on the operating situation, only the application quality or the application requirements or else both at the same time may change for an application.

The application quality indicates the quality of the camera images or the information obtained therefrom that is required for operation in a current operating situation. The quality of the camera images is a way of measuring whether an application can be operated therewith in a current operating situation.

If, for example, certain camera images have too low a resolution to be able to recognize certain features, an application for gaze direction identification, for example, cannot work. As a function of a predefined application quality for an application requirement, optimum configuration values are determined for respective applications by evaluating captured camera images, e.g., by measuring the current application quality, and determining the configuration values of the camera according to rules, tables, iteration, or calculation methods in such a way that the predefined application quality is achieved for respective applications, i.e., the measured application quality matches the predefined application quality. In other words, an optimum, i.e., a target configuration, is determined for each of the applications. The camera setting is established as a function of the rank order of the applications and the significance of the configuration values, which setting is then used simultaneously as the basis for all applications.

The application requirements are understood as meaning the requirements placed on the respective application in a respective operating situation. Specifically, this means which parameters of the camera need to be configured with which value or which setting for which boundary and surrounding conditions or in which operating situation for the applications, preferably according to their rank.

One advantageous development of the method provides that determining the application requirements includes at least one of the following work steps:
- reading out predefined application rules;
- evaluating sensor signals or assistance systems to estimate a future operating situation;
- reading out user settings;
- analyzing camera images to identify a blocked camera view;
- analyzing camera images to assess a lighting situation of a scene captured by the camera;
- analyzing camera images to detect objects and/or persons;
- evaluating sensor signals to perform a sensor fusion;
- reading out an application-specific priority.

Particularly preferably, all of the work steps listed are performed. In particular, the order of the steps listed is retained.

By way of example, reading out predefined application rules for the "driver monitoring" application or operating situation includes the application requirement that the eyes and the mouth of the person driving the vehicle must be visible in camera images and that a signal-to-noise ratio must not drop below a certain level.

By way of example, the speed of travel and acceleration of the vehicle can be analyzed using sensor signals in order to recognize when the vehicle brakes, for example before a traffic light, and to anticipate stopping before a traffic light as an application requirement. If the vehicle stops at the traffic light, monitoring the level of fatigue or the state of alertness of the person driving the vehicle is less important in the application ranking. Similarly, by recognizing current situations, the camera as a sensor can be used to draw conclusions about future situations and derive corresponding application requirements. For example, the status of an unoccupied seat will be retained for a foreseeable time frame, so that accordingly the rank for monitoring can be given lower priority for the future. In another example, driving through a tunnel is read out from an assistance system for a previous time frame. For this time frame, for example, the rank for color images can accordingly be given lower priority.

The option of being able to predefine user settings individually allows the interior monitoring system to be adapted to the preferences of individual vehicle users and the application requirements to be determined. For example, facial recognition can be deactivated to protect the privacy of the vehicle user. In this case, facial recognition is given a particularly low rank.

If the camera view is blocked, the camera might not be able to recognize the eyes of the person driving the vehicle. In this case, the "driver monitoring" application is given a particularly low rank.

If the scene captured by the camera is particularly dark, then, for example, applications that require the camera images to be captured in the infrared light spectrum are given a high rank and applications that require colored camera images to be captured are given a lower rank, and vice versa in the case of a particularly bright scene.

By detecting objects and/or persons, for example the location of a vehicle occupant in a vehicle can be established. If the rear passenger compartment is empty, an application for tracking the head position of vehicle occupants located in the rear passenger compartment is given a low rank.

As already mentioned, sensor data from other sensors can also be taken into account to determine the application rank order. By way of example, a vehicle speed can be used: if the vehicle is travelling at a speed below 10 km/h, there is no need to monitor the level of alertness and/or fatigue of the person driving the vehicle. Accordingly, these applications are given a particularly low rank in this operating situation.

An application-specific priority can also be defined for each application. For example, monitoring vital signs and/or recognizing fatigue can be given a particularly high priority value and an application for taking selfies a lower priority.

Preferably, estimating the future operating situation involves predicting a period of time in which a person does not blink, or until an observed person blinks again. If the observed person, for example the person driving the vehicle, has blinked, it is highly probable that they will not blink again for the next 300 ms, for example. If the camera records camera images at a frequency of 60 images per second for example, this means that for the next 18 camera images, performing the driver monitoring application is less important because no blink needs to be recognized. Accordingly, the interior monitoring system is set in such a way that the operating conditions for the next 18 camera images are better suited to performing the vital signs monitoring application. This could, for example, involve recording color images instead of camera images in the infrared light spectrum and/or evaluating another camera image range, in particular with another resolution. In other words, the application rank order given to driver monitoring is advantageously reduced in the future operating situation time frame so that other applications are given a higher rank than the driver monitoring and setting the parameters of said other applications ideally enables an optimized function without restriction, in particular if the parameter only allows conflicting settings, e.g., long or short exposure time.

A further advantageous embodiment of the method furthermore provides that to determine the application quality, at least one of the following image quality metrics, also to be understood as KPI (key performance index), is specified and is evaluated for at least one camera image to verify the application quality:
 a pixel saturation;
 a histogram;
 a signal-to-noise ratio;
 a structural similarity index;
 a complex wavelet structural similarity index; and/or
 a confidence value established by means of artificial intelligence.

To determine the confidence value, an artificial neural network can be used in particular. The listed image quality metrics of the camera images will differ depending on the selected parameterization or setting for the interior monitoring system. For example, the operating situation can change to the extent that the illumination of the scene captured by the camera is changed. If the parameters with which the camera images are generated remain constant, for example an exposure time or aperture, this will influence the corresponding quality of the captured camera images. By way of example, an image can then be overexposed or underexposed. If the application quality cannot be influenced by appropriate measures, the rank of the corresponding application can be lowered.

According to a further advantageous embodiment of the method, at least one of the following variables is set by means of, i.e., to set the target configuration:
 a selection of which camera out of a multiplicity of cameras is used to capture camera images;
 a selection of lighting devices which are used to light up a scene captured by the camera;
 a light emission characteristic of the lighting devices;
 an exposure time, ISO sensitivity, and/or aperture of the camera;
 a focal plane;
 a zoom level;
 a wavelength spectrum to be captured by the camera;
 an image capture rate of the camera;
 an image resolution;
 an image section of the captured camera images to be evaluated; and/or
 the way in which camera images are post-processed after capture.

Using the variables listed, various settings can be undertaken in order to adapt the mode of operation of the interior monitoring system to a respective operating situation. Depending on which application has a high rank, i.e., a high level of importance in the current operating situation, the corresponding parameters are configured according to the target configuration required by this application. Each setting of the camera parameters can be used to generate a corresponding application quality. If the scene captured by the camera is dark, for example, it can be lit up using the lighting devices for example and/or the exposure time, ISO sensitivity, or aperture of the camera can be adapted in order to take a more easily recognizable camera image. If a plurality of persons are be monitored and/or the view of a camera is obscured, for example, a second or even more cameras can be used to capture the scene.

The light emission characteristics of the lighting devices can be used, for example, to set whether a lighting device is to be operated in pulsed or continuous mode, and with which wavelength or in which wavelength band the respective lighting device is to emit light. By way of example, a lighting device can emit cold-white, warm-white, colored, and/or infrared light.

Different applications can also require focusing on different focal planes. Depending on which application has a high rank in a respective operating situation, the corresponding focal plane is focused on.

Similarly, depending on the application, it may be necessary to evaluate certain image sections with a certain zoom level or a certain image resolution in order to be able to recognize patterns, objects, structures, or the like that are relevant for the application.

To post-process camera images, filtering, image sharpening, tone mapping, and/or demosaicing, for example, can be applied to the corresponding camera images. Therefore, the post-processing of camera images can be customized using the target configuration.

A further advantageous embodiment of the method furthermore provides that at least one variable that can be set by means of the target configuration is also used as an application requirement. Depending on the application, it may be necessary to recognize certain features in certain image sections, for example. For this purpose, it may be necessary to set the focal plane, the zoom level, the image resolution, and/or the image section of a camera image to be evaluated to a standard value that is best suited to the respective operating situation. Applications that require a comparatively high image resolution, for example, are then given a correspondingly higher rank in the application rank order. This can be applied analogously to the further variables listed that can be set by means of the target configuration. A further example can be found in association with the cameras used to capture the scene. If, for example, a first and a second camera capture the scene, for example a vehicle interior, and the first camera is integrated in a dashboard of the vehicle and orientated towards the person driving the vehicle, then it can also capture parts of the rear. The second camera is integrated, for example, in a B pillar in the vehicle and orientated towards the rear. The first camera is then configured according to the target configuration demanded by an attention analysis, which requires, for example, capturing camera images with a particularly high frequency and in the infrared light spectrum, since the "person detection" application is already covered by capturing the rear of the vehicle via the second camera.

According to a further advantageous embodiment of the method, the application quality is preferably predicted for a future operating situation from at least one image quality metric or image quality characteristics established in the current and/or in a past operating situation from a value derived therefrom in the case of constant application requirements of at least one application. Determining the application quality for a future operating situation makes it possible to say how extensively the functionality of a certain application can be provided without possibly having to change the configuration of the camera or without having to advantageously maintain a parameter configuration for the unrestricted function. Future operating situations can, for example, be determined by means of a navigation system using a preview on a route travelled, for example changes in lighting conditions when entering or leaving in a tunnel, being stationary at traffic lights, orientation towards the sun, etc. Target configuration values for parameters of various applications can be predicted as a function of a required application quality, in which case the camera settings are then configured in preparation as a function of the rank of the applications and/or significance of the configuration values of the parameters, so that these are available for the applications without delay when the new operating conditions occur and the applications are ready for use without configuration processes.

According to a further advantageous embodiment of the method according to the invention, at least one application is formed by:
    gaze direction determination;
    fatigue identification;
    seat occupancy identification;
    facial recognition;
    vital signs monitoring;
    a photo and/or video recording functionality; or
    gesture recognition.

The photo and/or video recording functionality can be, for example, an application for performing video telephony. Each of the listed applications place individual requirements on the interior monitoring system. The respective target configurations for the individual parameters vary accordingly. These may be contradictory in some cases. For example, determining the gaze direction requires camera images to be captured in the infrared light spectrum and the photo and/or video recording functionality requires camera images to be captured in color. Seat occupancy identification and gesture recognition only require camera images with a comparatively low resolution in order to function correctly. By contrast, to perform facial recognition, camera images with a high resolution are required.

According to the invention, in an interior monitoring system comprising at least one camera and a computing unit, the camera and the computing unit are designed to perform a method as described above. The interior monitoring system can have a plurality of cameras and one or a plurality of lighting devices to light up a scene captured by the camera or cameras. The cameras can have different designs. By way of example, some cameras can have a fixed aperture and a fixed focal point and other cameras can be provided with a zoom lens, i.e., a variable focal point and a settable aperture. In addition, some cameras can capture light in the infrared light spectrum and other cameras in the visible range. Some cameras can also capture light in both the infrared light spectrum and in the visible range. Similarly, individual lighting devices can also emit light having only a certain wavelength or also a wavelength band. The lighting devices can be operated continuously or also in pulsed fashion. To control the lighting devices in the pulsed operating mode, these can be controlled with any desired modulation.

The computing unit can be formed by an individual computing device or can also be divided into a plurality of computing devices. By way of example, a first computing device can be provided for controlling the camera, a second computing device for evaluating camera images or sensor signals, and a third computing device for determining the application requirements, application quality, for determining the significance of configuration values and/or for determining the application rank order.

In the case of a vehicle comprising an interior monitoring system, according to the invention at least one camera is integrated in an instrument cluster, a head unit, an interior mirror, and/or in a roof control unit, in particular in relation to the vehicle transverse axis between the driver's side and passenger side and preferably in relation to the vehicle vertical axis at least level with the steering wheel. Using a camera installed in the center of the vehicle, i.e., a camera arranged between driver's side and passenger side and at least level with the steering wheel, a particularly large field of view of the vehicle interior can be captured. Due to the arrangement in the front region of the vehicle and orientation towards the rear, it is possible to capture vehicle occupants from the front. This makes it possible to provide a multiplicity of different applications. This also makes it possible to dispense with further cameras, which requires the application of the method according to the invention to find a configuration of the parameters used to set the interior monitoring system that is suitable for a respective operating situation and a respective application.

BRIEF DESCRIPTION OF THE DRAWING FIGURES

Further advantageous embodiments of the method according to the invention for operating a camera-based interior monitoring system, the interior monitoring system and the vehicle also become apparent from the exemplary embodiments, which are described in detail in the following with reference to the figures, in which.

DETAILED DESCRIPTION

Figure 1:
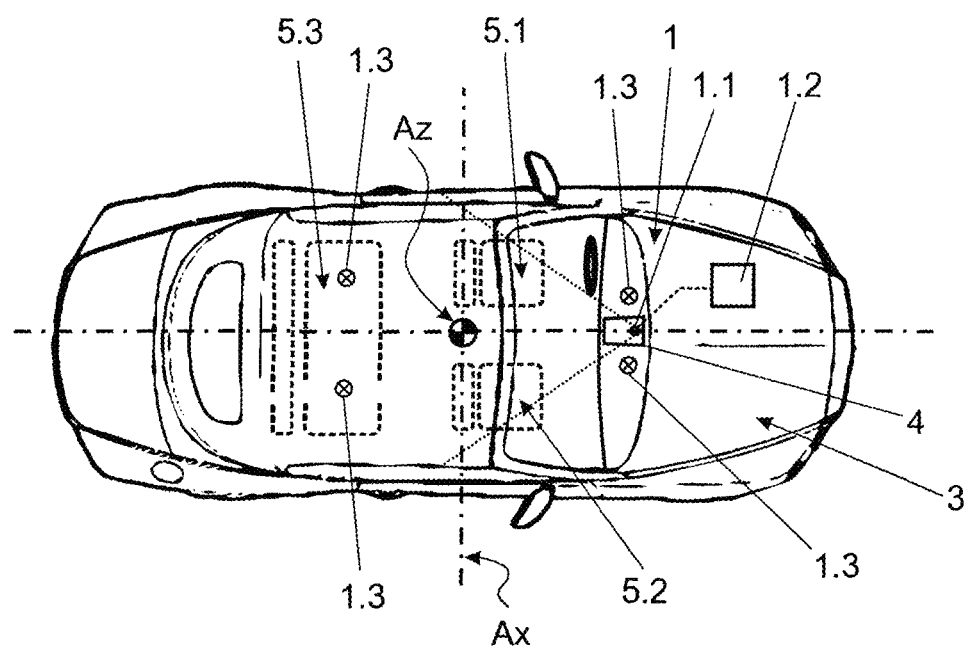
FIG. 1 shows a schematic plan view of a vehicle according to the invention.

FIG. 1 shows a vehicle 3 according to the invention. This comprises an interior monitoring system 1 according to the invention, comprising at least one camera 1.1, a computing unit 1.2, and a plurality of lighting devices 1.3. The camera 1.1 is arranged in relation to the vehicle transverse axis Ax between the driver's side and passenger side and is positioned in relation to the vehicle vertical axis Az at least level with the steering wheel. This enables a particularly wide-area capture of the vehicle interior, so that not only people sitting on the driver's seat 5.1 or the front passenger seat 5.2 can be captured, but also people who are sitting on the rear seats 5.3 in the rear of the vehicle 3. By way of example, the camera 1.1 is integrated in a head unit 4 of the vehicle 3.

The vehicle 3 can also have further cameras, not shown in detail. These can be integrated, for example, in an instrument cluster, a headliner, an A, B or C pillar, a vehicle seat, a dashboard, a roof control unit, an interior mirror, or the like. The same applies for the lighting devices 1.3. By way of example, a lighting device 1.3 can be arranged at the side at a comparatively short distance from a camera 1.1. Providing a plurality of lighting devices 1.3 makes it possible to light up the vehicle interior particularly extensively, thereby reducing the risk of overlooking relevant objects in areas of the vehicle interior that are too dark.

Figure 2:
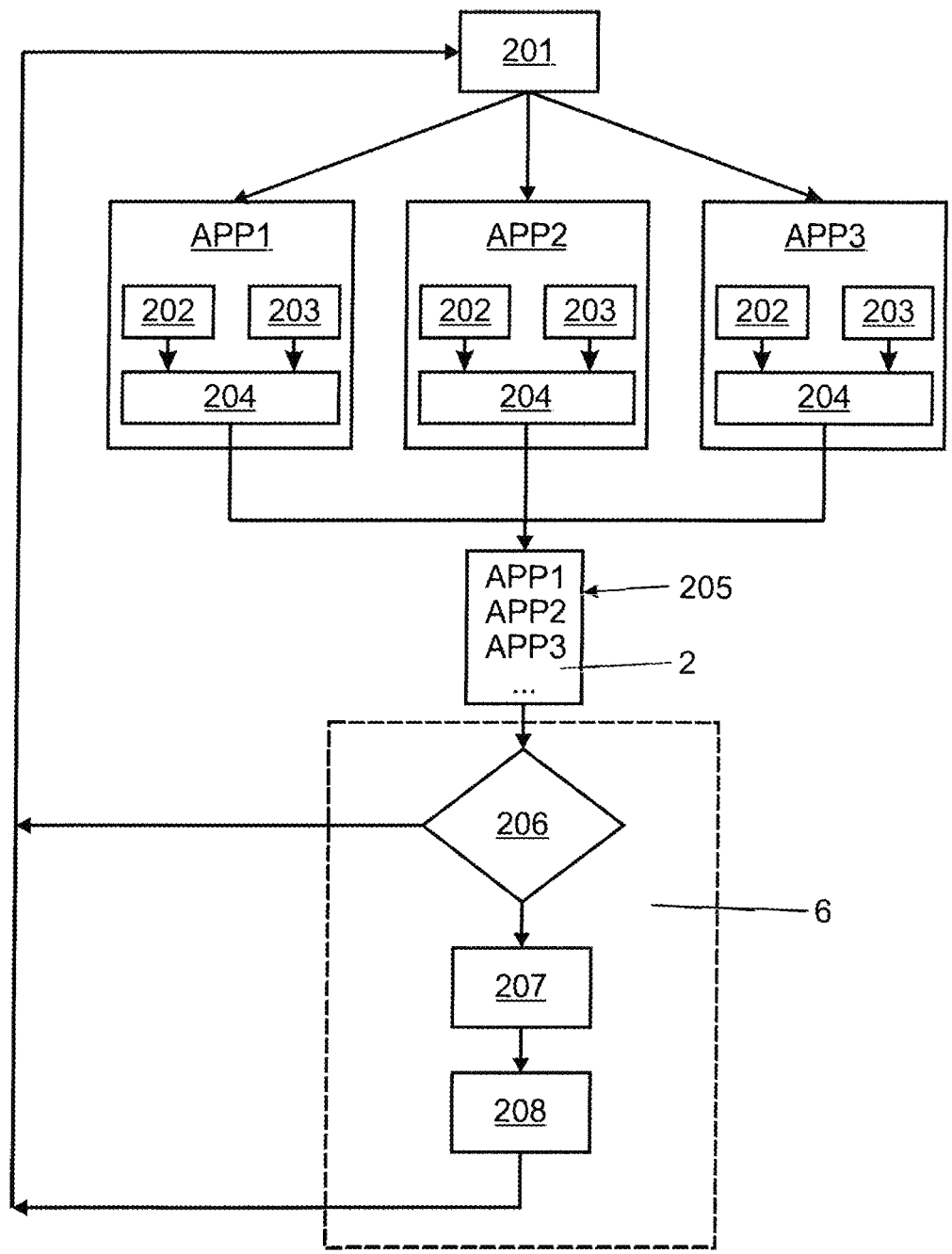
FIG. 2 shows a flow chart of a method according to the invention.

FIG. 2 shows a flow chart of a method according to the invention. In a method step 201, camera images are generated using the camera 1.1. These are read in and processed by the computing unit 1.2 so as to simultaneously provide a plurality of applications APP1, APP2 and APP3. For each application APP1, APP2, APP3, application requirements are determined in a method step 202. For this purpose, for example, a predefined target configuration for the interior monitoring system 1 is read out from a memory of the computing unit 1.2, a future operating situation is estimated, user settings are read out, camera images are analyzed in order, for example, to identify a blocked camera view, to assess a lighting situation in the vehicle interior, to detect objects and/or persons, or the like. For each application APP1, APP2, APP3, a predefined application-specific priority value can also be read out.

In a method step 203, the computing unit 1.2 determines an application quality to be achieved for each application APP1, APP2, APP3. The application quality represents, for example, an image quality metric of a camera image, for example a pixel saturation, a histogram, a signal-to-noise ratio, a structural similarity index, a complex wavelet structural similarity index, and/or a confidence value established by means of artificial intelligence. In this case, individual applications APP1, APP2, APP3 may require an individual minimum value for certain image quality metrics, so that the respective application APP1, APP2, APP3 can provide its respective functionality in full.

In a method step 204, a rank is determined for each application APP1, APP2, APP3, taking into account the application requirements and/or the application quality for an operating situation. The ranks of the applications APP1, APP2, APP3 are sorted in a method step 205 and an application rank order 2 is formed therefrom. In the example in FIG. 2, a first application APP1 has a highest rank, followed by a second application APP2 and a third application APP3.

In the method step 204, the computing unit 1.2 can also accord a significance to the configuration values of the parameters for APP1, APP2, APP3. If one or a plurality of parameters for setting the interior monitoring system 1 are configured according to the target configuration requested by the first application APP1, one or a plurality of further parameters can also be configured according to a target configuration requested by the subordinate applications APP2, APP3, i.e., required for optimum operation of the application, if the significance of the configuration value of the further parameter of the subordinate application APP2, APP3 corresponding to the target configuration is greater than the significance of the parameter corresponding to the target configuration of the superordinate application APP1. In other words, for example, the configuration value of the further parameter of the subordinate application APP2 corresponding to the target configuration is more significant in terms of quality than the higher-ranking application APP1, meaning that the function of the application APP1 is operated fully and the function is ensured. In this case, the first application APP1 is superior to the second application APP2 and the second application APP2 is superior to the third application APP3.

In a method step 206, an operating mode manager 6, which may be for example a program executed on the computing unit 1.2, checks whether there has been a change in the application rank order 2 or a reassignment of significances for the configuration values of the parameters of the applications APP1, APP2, APP3 due to a changed operating situation and associated changed application requirements and/or application quality. If this is not the case, no changes are made to the setting of the interior monitoring system 1 and camera images continue to be taken.

If, by contrast, the application rank order 2 has changed due to a changed operating situation and/or the significance of the configuration values of the parameters of the respective applications APP1, APP2, APP3 have been changed, then the target configurations for the individual parameters for setting the interior monitoring system 1 are determined in a method step 207. These are then set in method step 208, so that the interior monitoring system 1 captures and evaluates camera images according to the new setting.

The method step 207 can also include estimating future operating situations. In this case, expected application qualities can be predicted for future operating situations for the individual applications APP1, APP2, APP3. This makes it possible to check whether a predetermined target configuration parameter set is suitable for providing the functionalities of the individual applications APP1, APP2, APP3 to a greater extent or with a higher degree of reliability. This makes it possible to find a target configuration parameter set that is particularly optimized for the respective operating situation, so that as many applications APP1, APP2, APP3 provided by the computing unit 1.2 as possible work in the best possible way in the respective operating situation.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a camera-based interior monitoring system, the method comprising:
   capturing, by at least one camera as at least one sensor, captures camera images;
   evaluating, by a computing unit, sensor signals; and
   configuring, by the computing unit, parameters for setting the interior monitoring system based on the evaluated sensor signals,
   wherein the computing unit executes at least two applications, each of which requires a different configuration value for at least one parameter at a same time in a certain operating situation,
   wherein the computing unit establishes a current application rank order for a current operating situation and sets, as a target configuration, a configuration value for a first parameter required by a first one of the at least two applications having a higher rank than another one of the at least two applications,
   wherein configuration values of parameters for each of the at least two applications are accorded a significance and at least one further parameter is configured according to the target configuration required by a subordinate application in the current application rank order when a significance of a configuration value of the target configuration of the further parameter of the subordinate application is greater than a significance of a configuration value of the target configuration of the parameter of the superordinate application, and
   wherein the computing unit determines application requirements or an application quality for each application for a respective current or future operating situation and determines the application rank order based on the determined application requirements or the determined application quality of a respective application.

2. The method of claim 1, wherein the determination of the application requirements includes at least one of the following:
   reading out predefined application rules;
   evaluating sensor signals or assistance systems to estimate a future operating situation;
   reading out user settings;
   analysing camera images to identify a blocked camera view;
   analysing camera images to assess a lighting situation of a scene captured by the camera;
   analysing camera images to detect objects or persons;
   evaluating sensor signals to perform a sensor fusion; and
   reading out an application-specific priority.

3. The method of claim 1, wherein the determination of estimating the future operating situation involves predicting a period of time until an observed person blinks again.

4. The method of claim 1, wherein the determination of the application quality involves evaluating, for at least one camera image, at least one of the following image quality metrics:
   a pixel saturation;
   a histogram;
   a signal-to-noise ratio;
   a structural similarity index;
   a complex wavelet structural similarity index; and
   a confidence value established by means of artificial intelligence.

5. The method of claim 1, wherein at least one of the following variables is set by the target configuration:
   a selection of which camera out of a plurality of cameras is used to capture camera images;
   a selection of lighting devices used to light up a scene captured by the camera;
   a light emission characteristic of the lighting devices;
   an exposure time, ISO sensitivity, or aperture of the camera;
   a focal plane;
   a zoom level;
   a wavelength spectrum to be captured by the camera;
   an image capture rate of the camera;
   an image resolution;
   an image section of the captured camera images to be evaluated; and
   a manner of post-processing camera images after capture.

6. The method of claim 5, wherein at least one variable that is settable by the target configuration is used as an application requirement of one of the at least two applications.

7. The method of claim 1, wherein the application quality of the first one of the at least two applications is predicted for a future operating situation from
   at least one image quality metric established in a current or in a past operating situation, or
   a value derived from a selection of the image quality metrics.

8. The method of claim 1, wherein the first one of the at least two applications is an application for:
   gaze direction determination;
   fatigue identification;
   seat occupancy identification;
   facial recognition;

vital signs monitoring;
a photo or video recording functionality; or
gesture recognition.

9. An interior monitoring system comprising:
at least one camera; and
a computing unit coupled to the at least one camera,
wherein the at least one camera is configured to capture, as at least one sensor, camera images;
wherein the computing unit is configured to evaluate sensor signals and configure parameters for setting the interior monitoring system based on the evaluated sensor signals,
wherein the computing unit is configured to execute at least two applications, each of which requires a different configuration value for at least one parameter at a same time in a certain operating situation,
wherein the computing unit is configured to establish a current application rank order for a current operating situation and sets, as a target configuration, a configuration value for a first parameter required by a first one of the at least two applications having a higher rank than another one of the at least two applications,
wherein configuration values of parameters for each of the at least two applications are accorded a significance and at least one further parameter is configured according to the target configuration required by a subordinate application in the current application rank order when a significance of a configuration value of the target configuration of the further parameter of the subordinate application is greater than a significance of a configuration value of the target configuration of the parameter of the superordinate application, and
wherein the computing unit is configured to determine application requirements or an application quality for each application for a respective current or future operating situation and determines the application rank order based on the determined application requirements or the determined application quality of a respective application.

10. A vehicle comprising:
an interior monitoring system, which comprises
at least one camera integrated in an instrument cluster, a head unit, an interior mirror, or a roof control unit of the vehicle; and
a computing unit coupled to the at least one camera,
wherein the at least one camera is configured to capture, as at least one sensor, camera images;
wherein the computing unit is configured to evaluate sensor signals and configure parameters for setting the interior monitoring system based on the evaluated sensor signals,
wherein the computing unit is configured to execute at least two applications, each of which requires a different configuration value for at least one parameter at a same time in a certain operating situation,
wherein the computing unit is configured to establish a current application rank order for a current operating situation and sets, as a target configuration, a configuration value for a first parameter required by a first one of the at least two applications having a higher rank than another one of the at least two applications,
wherein configuration values of parameters for each of the at least two applications are accorded a significance and at least one further parameter is configured according to the target configuration required by a subordinate application in the current application rank order when a significance of a configuration value of the target configuration of the further parameter of the subordinate application is greater than a significance of a configuration value of the target configuration of the parameter of the superordinate application, and
wherein the computing unit is configured to determine application requirements or an application quality for each application for a respective current or future operating situation and determines the application rank order based on the determined application requirements or the determined application quality of a respective application.

11. The vehicle of claim 10, wherein the at least one camera is arranged, relative to a vehicle transverse axis, between a driver's side and passenger side of the vehicle.

12. The vehicle of claim 11, wherein the at least one camera is arranged, relative to a vertical axis of the vehicle, at least level with a steering wheel of the vehicle.

* * * * *